United States Patent [19]
Ezawa

[11] Patent Number: 5,521,668
[45] Date of Patent: May 28, 1996

[54] FILM GUIDE MECHANISM OF CAMERA

[75] Inventor: Akira Ezawa, Tokyo, Japan

[73] Assignee: Nikon Corporation, Tokyo, Japan

[21] Appl. No.: 462,545

[22] Filed: Jun. 5, 1995

Related U.S. Application Data

[63] Continuation of Ser. No. 201,086, Feb. 24, 1994, abandoned, which is a continuation of Ser. No. 793,207, Nov. 18, 1991, abandoned.

[30]   Foreign Application Priority Data

Nov. 26, 1990   [JP]   Japan ................... 2-321502

[51] Int. Cl.$^6$ .......................... G03B 17/00; G03B 17/02
[52] U.S. Cl. ............................................ 354/203; 354/288
[58] Field of Search .................................. 354/203, 206, 354/275, 288

[56]    References Cited

U.S. PATENT DOCUMENTS

| | | | |
|---|---|---|---|
| 2,584,401 | 2/1952 | Thralls | 354/203 |
| 3,110,237 | 11/1963 | Scholkemeier et al. | 354/203 |
| 3,820,142 | 6/1974 | Beach | 354/206 |
| 4,132,473 | 1/1979 | Kohdo | 354/203 |
| 4,457,607 | 7/1984 | Sekine et al. | 354/203 |
| 4,609,271 | 9/1986 | Watanabe | 354/202 |
| 4,685,790 | 8/1987 | Uematsu | 354/203 |
| 4,832,275 | 5/1989 | Robertson | 242/71.1 |
| 4,834,306 | 5/1989 | Roberston et al. | 242/71.1 |
| 4,956,658 | 9/1990 | Smart | 354/212 |
| 4,992,812 | 2/1991 | Smart | 354/203 |
| 5,142,316 | 8/1992 | Tanii et al. | 354/212 |
| 5,202,713 | 4/1993 | Nakai et al. | 354/212 |
| 5,268,713 | 12/1993 | Kataoka | 354/288 |

*Primary Examiner*—Howard B. Blankenship
*Assistant Examiner*—Nicholas J. Tuccillo
*Attorney, Agent, or Firm*—Shapiro and Shapiro

[57]              ABSTRACT

A film guide mechanism of a camera has two opposite film guide surfaces which are substantially parallel and which define a film passage between a film cartridge chamber and a film take-up spool. Rotation of a spool shaft of a film cartridge delivers film, which has been wound around the spool shaft, through a delivery port of the film cartridge and into the film passage. At least one inclined plane formed between the delivery port and the film passage guides a leading edge of the film from the delivery port to the film passage.

4 Claims, 3 Drawing Sheets

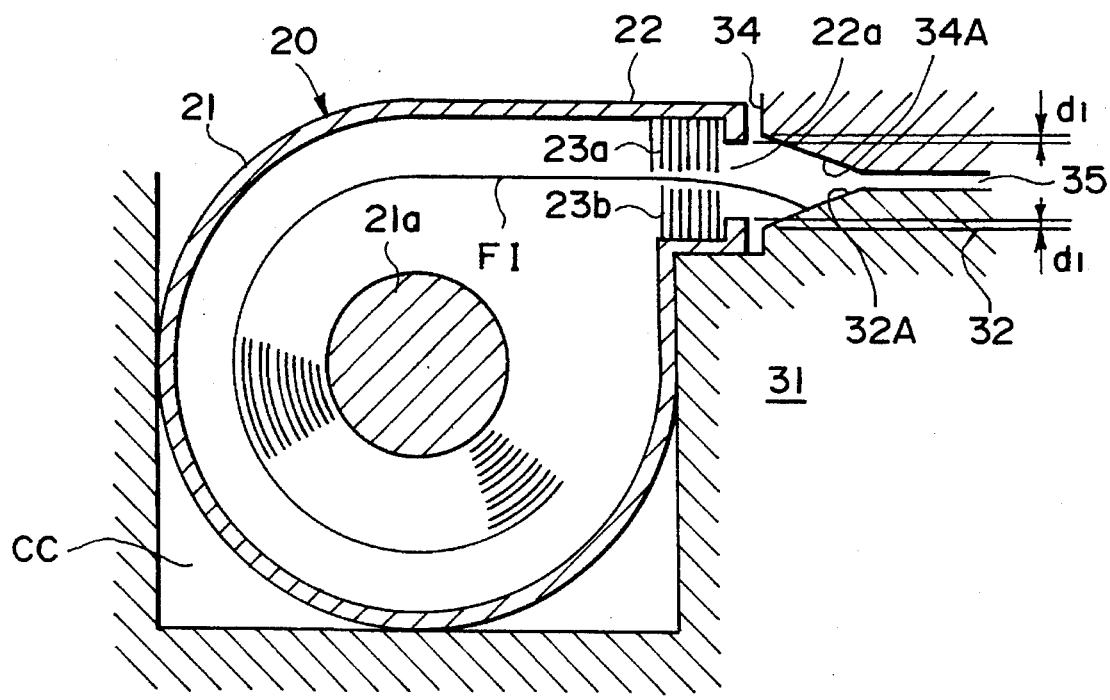
F I G. 1
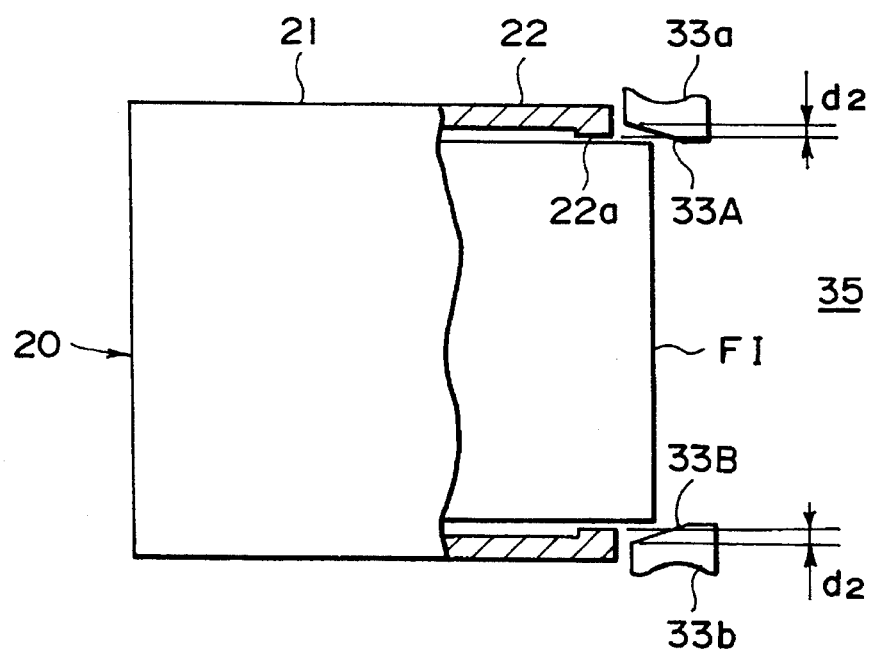
F I G. 2

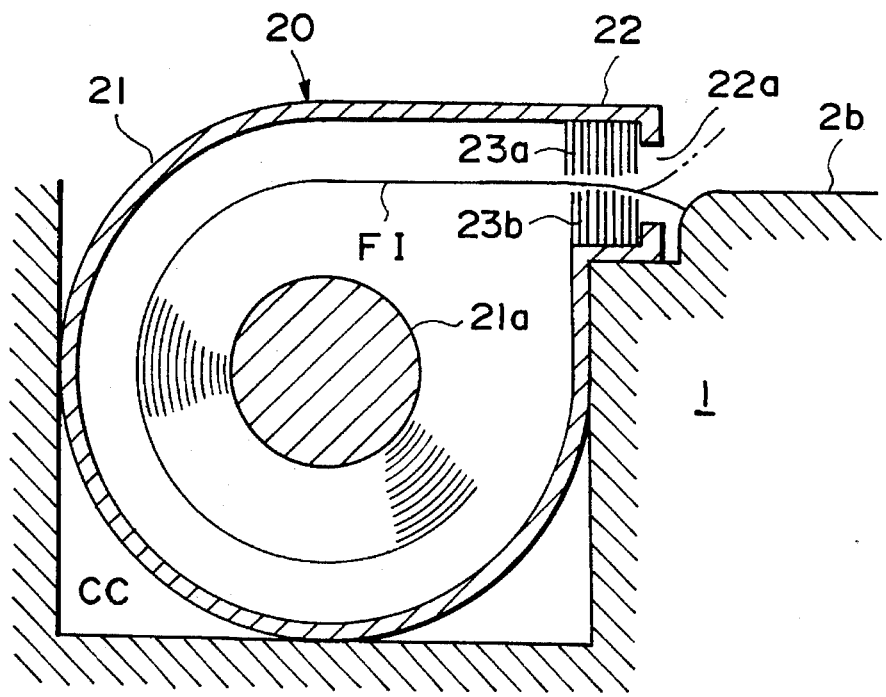
F I G. 4
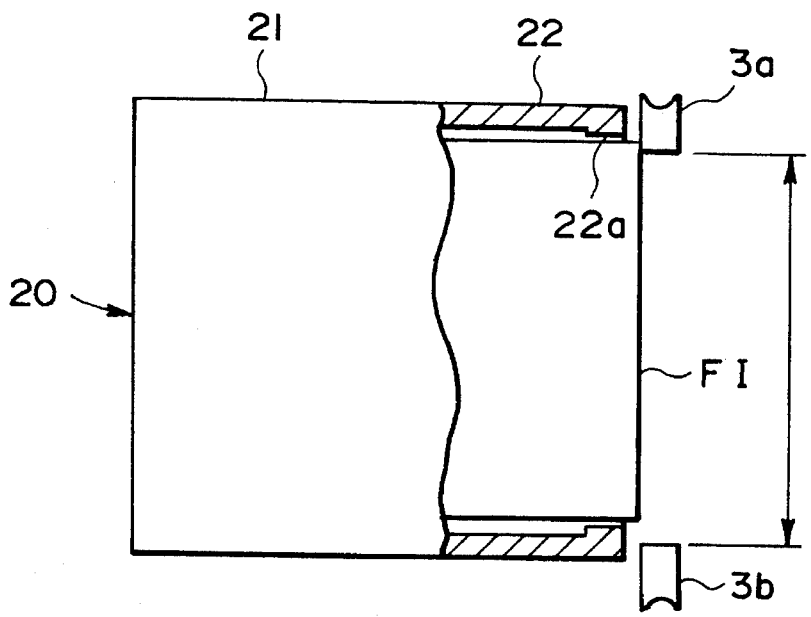
F I G. 5

FILM GUIDE MECHANISM OF CAMERA

This is a continuation of application Ser. No. 08/201,086 filed Feb. 24, 1994, which is a continuation of application Ser. No. 07/793,207 filed Nov. 18, 1991, both abandoned.

BACKGROUND OF THE INVENTION

1. Field of the Invention

This invention relates to a film guide mechanism for use in a camera in which film is delivered through the film-cartridge delivery port by rotating the spool shaft of the film cartridge.

2. Related Background Art

FIG. 3 is a perspective view of a camera in which a conventional film cartridge model 135 can be loaded. In FIG. 3, a film cartridge 10 has a cylindrical portion 11 and a delivery portion 12. Within the cylindrical portion 11, film FI is housed in a wound state, and the leading edge thereof has been drawn out from the delivery portion 12 beforehand. In a camera main body 1, a film cartridge chamber CC, in which the above film cartridge 10 is loaded, is formed on one end side, and a spool chamber (not shown), in which a film take-up spool is housed, is provided on the other end side. An aperture AP is provided between the film cartridge chamber CC and the spool chamber.

Numerals 2a and 2b are inner rails for positioning the film FI, and control members 3a and 3b control the movement of the film FI in the width direction. A curved surface is formed on an angular area between the wall of the film cartridge chamber CC on the aperture side and a plane 4 in which the aperture AP has been formed. Curved surfaces are also formed on the angular areas of the inner rails 2a and 2b on the film cartridge chamber side as shown in FIG. 4 in order to prevent film to be delivered from being damaged by the angular areas.

The film cartridge 10 is loaded in the film cartridge chamber CC with the film FI drawn out as shown in FIG. 3. When the back cover (not shown) is closed after the leading edge of the film FI is wound around the film take-up spool, the film is held in a film passage between a pressure plate fitted to the back cover and the above film rails 2a and 2b to keep the film FI in a plane state by the pressure plate. When the film take-up spool is rotated in this state, the film FI is wound.

In, for example, U.S. Pat. Nos. 4,832,275 and 4,834,306, such a film cartridge 20 as shown in FIG. 4 is disclosed. The film cartridge 20 has a cylindrical portion 21 and a delivery portion 22 which is projected in the tangential direction thereof. At the tip end of the delivery portion 22, a film delivery port 22a is provided, and a spool shaft 21a is rotatably supported within the cylindrical portion 21. The film FI is housed while it is wound around this spool shaft 21a, and the leading edge of the film FI is located within the film cartridge 20 before the film cartridge 20 is loaded in the camera. In other words, the leading edge of the film FI is not drawn out from the delivery portion 22, unlike the above film cartridge 10. The delivery poriton 22 is provided with light shielding members 23a and 23b.

When such a constituted film cartridge 20 is loaded in the above-mentioned film cartridge chamber CC of a camera main body 1 as shown in FIG. 1, the spool shaft 21a is connected with the film delivery mechanism on the camera main body 1 side, which rotates the spool shaft 21a clockwise in FIG. 1. This drives the film FI to deliver its leading edge outward from the delivery port 22a through between the light shielding members 23a and 23b. The delivered film FI passes along the film passage between the above-mentioned pressure plate of back cover and the film rails 2a and 2b and is guided into the film take-up spool (not shown).

Such a film cartridge 20 will be called "thrust film cartridge" in this specification.

This thrust film cartridge 20 has an advantage that it can be simply loaded in a camera main body. Since, however, the leading edge of the film FI is not drawn out from the film cartridge, the following problems occur when it is loaded in the above-mentioned conventional camera.

That is, the leading edge of the film FI is curled as shown in FIG. 4 even after it has been delivered from the film cartridge 20 because of a peculiarity of winding when the film was wound around the spool shaft 21a within the film cartridge 20. For this reason, the leading edge of the film FI is likely to drop as shown in FIG. 4 by abutting on the curved surface of the inner rails 2a and 2b, and not to be guided into the film passage, making it impossible to deliver the film FI.

Also when delivering of the film is continued in this state, the film is jammed within the film cartridge 20, and will be useless. Such a problem easily occurs especially when the light shielding member 23a has been manufactured longer than 23b owing to size variations during manufacture. Further under a special circumstance, the film FI may curl in the opposite direction to the above as shown in alternate long and two short dashes line, and the same problem as mentioned above occurs in this case.

With regard to the film width direction, on the other hand, when the film cartridge 20 is placed on the bias against the control members 3a and 3b as shown in FIG. 5, the film is likely to strike the control member 3a (or 3b), making it impossible to deliver the film or making it useless in the same way as mentioned above.

SUMMARY OF THE INVENTION

It is an object of the present invention to provide a film guide mechanism of a camera capable of securely delivering film even when such a thrust film cartridge as mentioned above is used.

The present invention relates to a film guide mechanism of a camera having two film guide surfaces, which are almost parallel and opposite to each other, defining a film passage between a film cartridge chamber and a film take-up spool. Film which has been wound around the spool shaft is advanced by rotating the spool shaft of the film cartridge, and is delivered through the delivery port of the film cartridge into the film passage. The improvement resides in at least one inclined plane, which has been obliquely formed between the film delivery port and the film passage, for properly guiding the leading edge of the film from the film delivery port to the film passage.

In the above-mentioned film guide mechanism according to the present invention, the leading edge of the film delivered from the film delivery port of the film cartridge is so smoothly guided into the film passage by the inclined plane that the film is not caught at the inlet of the film passage.

For example, if the inclined plane is designed to have a slant toward the film guide surface, it is possible to securely deliver the film by correcting the position of the film leading edge even if it curls and by preventing the film from jamming. Also the inclined plane may be inclined so that the position of the film leading edge is controlled in the film width direction.

BRIEF DESCRIPTION OF THE DRAWINGS

FIGS. 1 and 2 show an embodiment according to the present invention. FIG. 1 is a section view showing the vicinity of the film cartridge chamber of a camera according to the present invention, and FIG. 2 is a view as viewed from behind the camera.

FIGS. 3 to 5 show a conventional example. FIG. 3 is a perspective view showing a conventional camera, FIG. 4 is a section view showing the vicinity of its film cartridge chamber, and FIG. 5 is a view as viewed from behind the camera.

DESCRIPTION OF THE PREFERRED EMBODIMENTS

Figure 3:
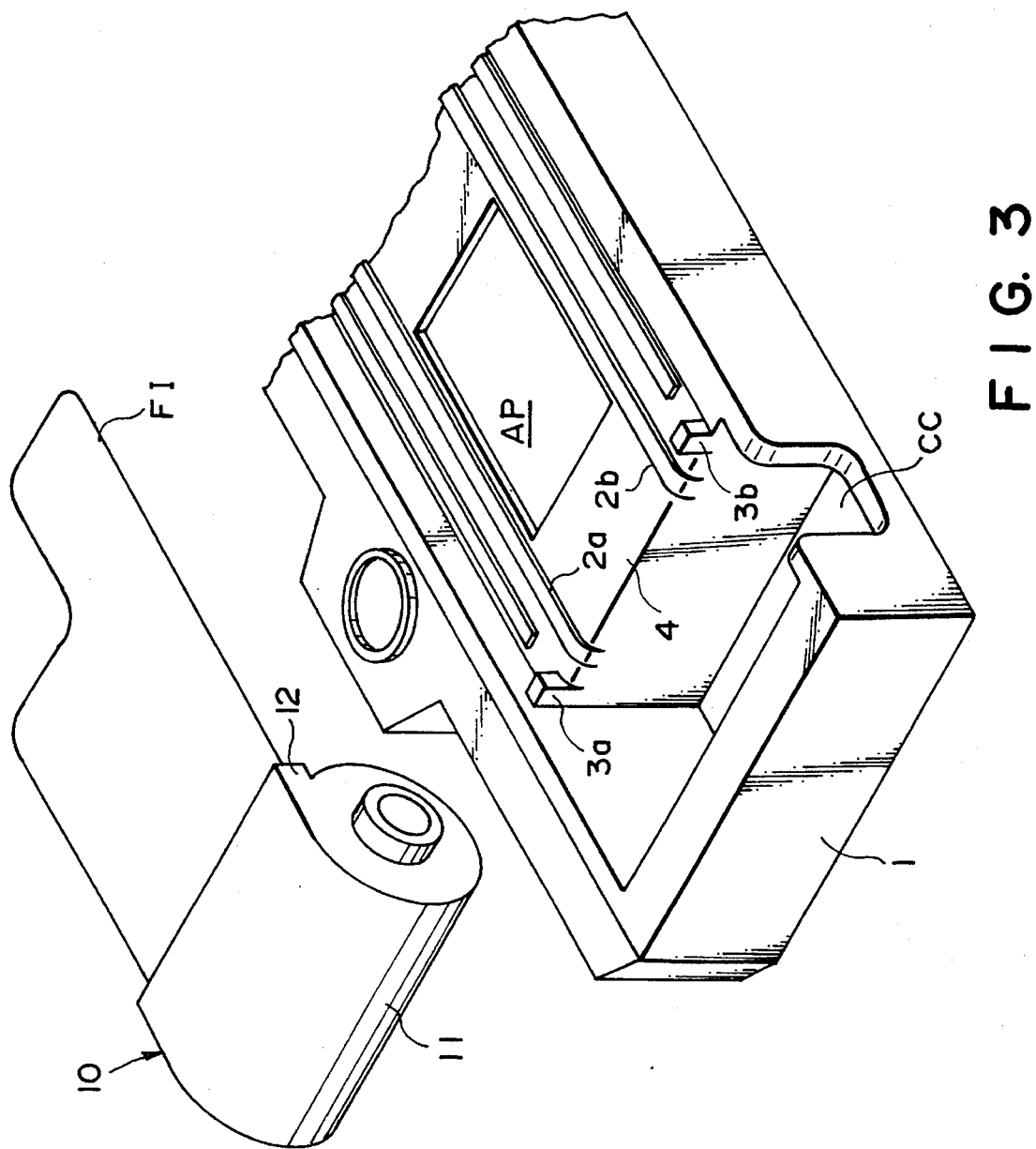

An embodiment according to the present invention will be described referring to FIGS. 1 and 2.

FIG. 1 is a section view showing the vicinity of the film cartridge chamber of a camera according to the present invention as viewed from above the camera. The film cartridge chamber CC is formed on one end side of a camera main body 31. A pair of inner rails (only one side shown) 32 are provided above and below the aperture (not shown). Numeral 20 is a thrust film cartridge described in the Related Background Art. In a camera according to the above embodiment, a back cover for exposing the entire back surface of the camera main body is not provided, unlike a conventional camera, but a cover (film cartridge cover) capable of exposing only the film cartridge chamber CC is provided so that the aperture and spool chamber (not shown) are not exposed when the film cartridge cover is opened. Therefore, a pressure plate 34, which holds the film FI in a plane state, is provided on the camera main body 31.

A film passage 35 for guiding the film FI on the right (aperture side) in FIG. 1 is formed by substantially parallel film guide surfaces provided by the pressure plate 34 and the film rails 32. An inclined plane 32A, which has a slant away from port 22a and toward the film thickness direction of the film passage 35, is formed on the film rail 32 from the end thereof on the film cartridge chamber side through the above-mentioned film passage 35 on the film rail 32, and also an inclined plane 34A is similarly formed on the corresponding area of the pressure plate 34, so that planes 32A and 34A converge toward the film passage 35 and the spacing between them decreases continuously in the film thickness direction. The ends of each inclined plane 32A and 34A on the film cartridge chamber side are constructed so that these are located at positions d1 each away from (beyond) the delivery port 22a of the film cartridge 20 to be loaded in the film cartridge chamber CC in the film thickness direction.

FIG. 2 is a view of the vicinity of the above film cartridge chamber as viewed from behind the camera. Control members 33a and 33b control the position of the film FI in the width direction, and are provided in a plane (not shown) in which the aperture is formed. On the control members 33a and 33b, inclined planes 33A and 33B, which have a slant away from port 22a and toward the film width direction of the film passage 35, are formed respectively so as to converge from the end on the film cartridge chamber side toward the film passage 35. The inclined planes 33A and 33B are constructed immovably so that a space defined between their respective ends adjacent to film passage 35 is at all times wider than the width of the leading edge of the film FI.

The ends of each of the inclined planes 33A and 33B on the film cartridge chamber side are constructed so that these are located at positions d2 each away from (beyond) the delivery port 22a of the film cartridge 20 to be loaded in the film cartridge chamber CC in the film width direction.

The operation of the embodiment will be described.

When a film cartridge 20 is loaded in the film cartridge chamber CC as shown in FIG. 1 and the film cartridge cover is closed, the spool shaft 21a in the film cartridge 20 is connected with the film delivery mechanism. When the spool shaft is rotated clockwise in FIG. 1 by the film FI delivery mechanism, the film FI is driven to deliver its leading edge through the delivery port 22a. Since the leading edge of the delivered film FI is curled as mentioned above because of the peculiarity of winding, it normally abuts on the inclined plane 32A of the inner rail 32. Also when the position of the film FI in the width direction has slipped, the leading edge abuts on the inclined plane 33A (33B) of the control member 33a (33b).

Therefore, the film FI to be delivered is securely guided into the film passage 35 since the position in the thickness direction is corrected at the inclined plane 32A and also the position in the width direction is corrected at the inclined plane 33A (33B). Thereafter the film FI passes the aperture into the spool chamber while it is being guided into the film passage 35, and is wound around the film take-up spool, and then is taken up by the rotation of the film take-up spool.

When the leading edge of the delivered film FI has been curled in the opposite direction to the above as shown in alternate long and two short dashes line in FIG. 4 under a special circumstance, it abuts on the inclined plane 34A on the pressure plate 34 side to correct the position in the thickness direction at the inclined plane 34A, and is guided into the film passage 35.

In the above embodiment, the ends of each of the inclined planes 32A and 34A on the film cartridge chamber side are constructed so that these are located at positions d1 each away from the delivery port 22a of the film cartridge 20 to be loaded in the film cartridge chamber CC in the film thickness direction. Therefore it is possible to securely guide the film FI into the film passage 35 even if the position, where the film FI is delivered, changes in the thickness direction because of variations in the length of the light shielding members 23a and 23b provided at the above-mentioned delivery port 22a.

Also with regard-to the width direction, the ends of each of the inclined planes 33A and 33B on the film cartridge chamber side are constructed so that these are located at positions d2 each away from the delivery port 22a of the film cartridge 20 in the film width direction. Therefore, it is possible to securely guide the film into the film passage 35 even if the deviation of the film FI to be delivered is great in the width direction.

Although a camera with a pressure plate provided on the camera main body side has been described in the foregoing, the present invention can be also applied to a camera having a conventional back cover with a pressure plate provided thereon. Also an inclined plane, which has a slant in the thickness direction, may be provided only either on the pressure plate side or on the inner rail side. Further the formation of an inclined plane is not limited to the pressure plate and the inner rail, but such an inclined plane which has a slant in the film thickness direction as mentioned above may be provided on an angular area between the wall of the film cartridge chamber CC on the aperture side and the plane in which the aperture is formed.

Moreover, even if the ends of each of the inclined planes 32A and 34A on the film cartridge chamber side are not away from the delivery port 22a of the film cartridge 20 in the film thickness direction, or even if the ends of each inclined planes 33A and 34B on the film cartridge chamber side are not away from the delivery port 22a of the film cartridge 20 in the film width direction, an effect to a certain degree can be obtained by providing such an inclined surface.

What is claimed is:

1. A film guide mechanism of a camera having a pair of elongated substantially parallel film guide surfaces defining a film guiding passage extending from a location adjacent to a film cartridge chamber, past a film exposure aperture, to a location adjacent to a film take-up spool, the film cartridge chamber receiving a film cartridge having a spool shaft on which film has been wound and having a delivery port through which a leading edge of the film is pushed out by rotation of the spool shaft, the film guide mechanism comprising a first pair of spaced inclined planes formed so as to be disposed between the film delivery port and the film passage and to converge away from the film delivery port and toward a film thickness direction of the film passage, with a spacing between said first pair of inclined planes decreasing continuously in the film thickness direction from an end of each of the inclined planes of the first pair adjacent to the film delivery port to an opposite end of each of the inclined planes of the first pair at an entrance between the parallel guide surfaces of the film passage, so that the leading edge of the film is guided by the first pair of inclined planes in a direction parallel to the film thickness direction of the film passage, said end of each of the inclined planes of the first pair adjacent to the film delivery port being positioned beyond the film delivery port in a direction parallel to the film thickness, the length of each of the inclined planes of the first pair being substantially less than the length of the film passage, and a second pair of spaced inclined planes formed so as to be disposed between the film delivery port and the film passage and to converge away from the film delivery port and toward a film width direction of the film passage, with a spacing between said second pair of inclined planes decreasing continuously in the film width direction from an end of each of the inclined planes of the second pair adjacent to the film delivery port to an opposite end of each of the inclined planes of the second pair, said opposite ends of the inclined planes of the second pair merging with respective parallel surfaces at said entrance of the film passage, so that the leading edge of the film is guided by the second pair of inclined planes in a direction parallel to the film width, an end of each of the inclined planes of the second pair adjacent to the film delivery port being positioned beyond the film delivery port in a direction parallel to the film width, the second pair of inclined planes being constructed immovably so that a space defined between said opposite ends of the inclined planes of the second pair adjacent to said entrance of the film passage is at all times wider than the width of said leading edge of the film, whereby the film is properly guided from the film delivery port to the film passage.

2. A film guide mechanism according to claim 1, wherein said opposite end of each inclined plane of said first pair of inclined planes merges with a corresponding one of said film guide surfaces of said film passage.

3. A film guide mechanism according to claim 1, wherein said inclined planes of the first pair have substantially the same inclination angles.

4. A film guide mechanism of a film feeding device having a pair of elongated substantially parallel film guide surfaces defining a film guiding passage extending from a location adjacent to a film cartridge chamber, to a location adjacent to a film take-up spool, the film cartridge chamber receiving a film cartridge having a spool shaft on which film has been wound and having a delivery port through which a leading edge of the film is pushed out by rotation of the spool shaft, the film guide mechanism comprising a first pair of spaced inclined planes formed so as to be disposed between the film delivery port and the film passage and to converge away from the film delivery port and toward a film thickness direction of the film passage, with a spacing between said first pair of inclined planes decreasing continuously in the film thickness direction from an end of each of the inclined planes of the first pair adjacent to the film delivery port to an end of each of the inclined planes of the first pair at an entrance between the parallel guide surfaces of the film passage, so that the leading edge of the film is guided by the first pair of inclined planes in a direction parallel to the film thickness direction of the film passage, said end of each of the inclined planes of the first pair adjacent to the film delivery port being positioned beyond the film delivery port in a direction parallel to the film thickness, the length of each of the inclined planes of the first pair being substantially less than the length of the film passage, and a second pair of spaced inclined planes formed so as to be disposed between the film delivery port and the film passage and to converge away from the film delivery port and toward a film width direction of the film passage, with a spacing between said second pair of inclined planes decreasing continuously in the film width direction from an end of each of the inclined planes of the second pair adjacent to the film delivery port to an opposite end of each of the inclined planes of the second pair, said opposite ends of the inclined planes of the second pair merging with respective parallel surfaces at said entrance of the film passage, so that the leading edge of the film is guided by the second pair of inclined planes in a direction parallel to the film width, an end of each of the inclined planes of the second pair adjacent to the film delivery port being positioned beyond the film delivery port in a direction parallel to the film width, the second pair of inclined planes being constructed immovably so that a space defined between said opposite ends of the inclined planes of the second pair adjacent to said entrance of the film passage is at all times wider than the width of said leading edge of the film, whereby the film is properly guided from the film delivery port to the film passage.

* * * * *